Patented July 30, 1940

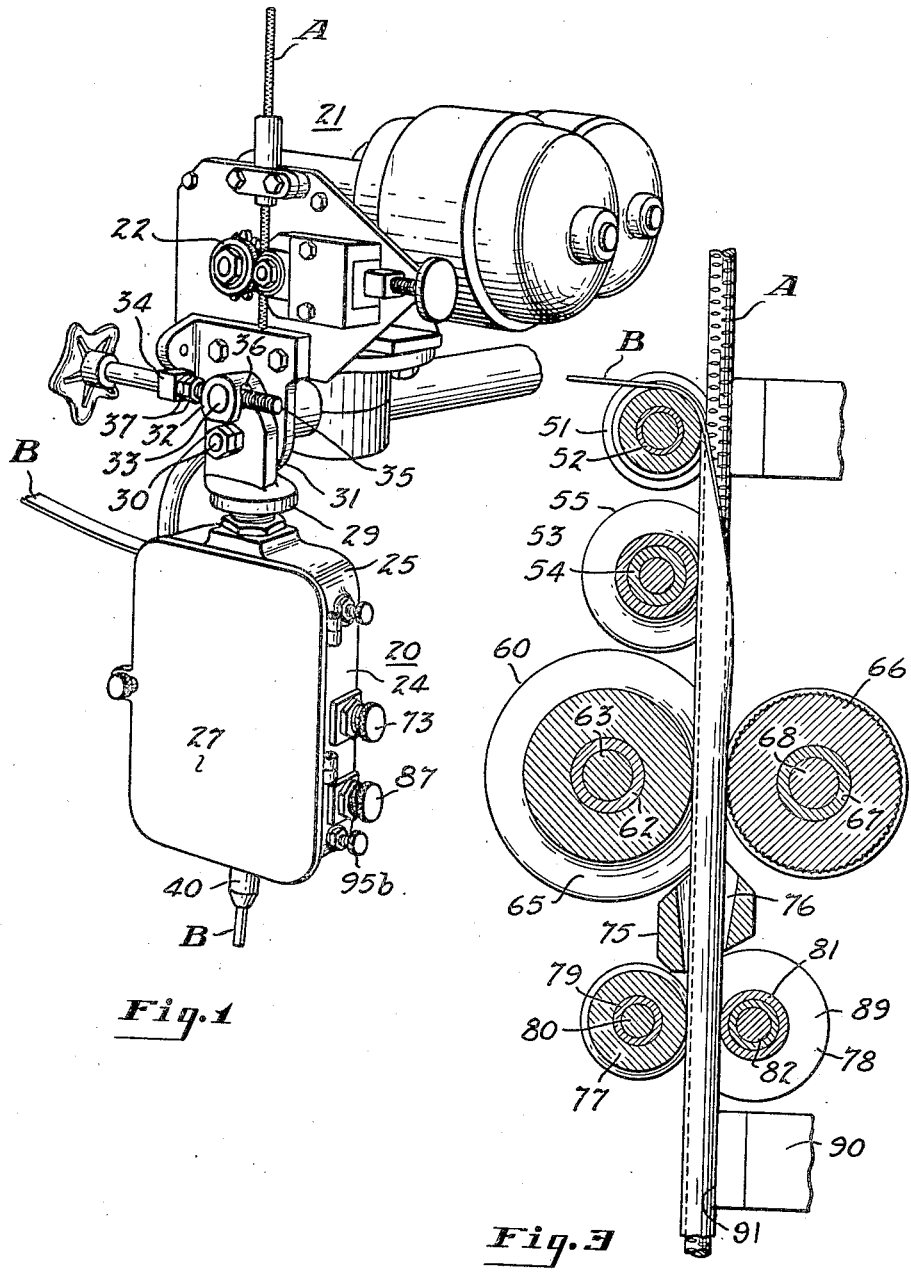

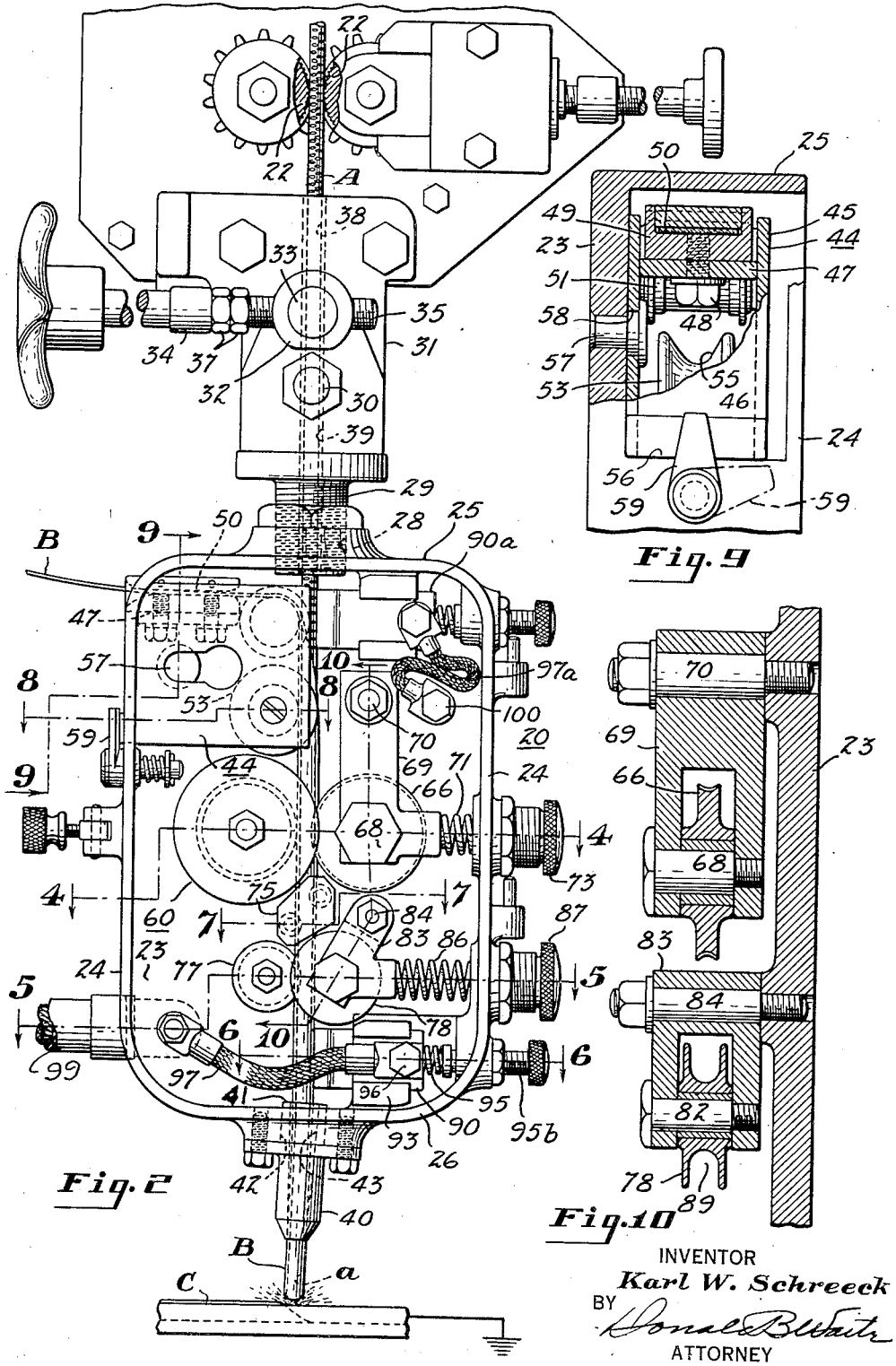

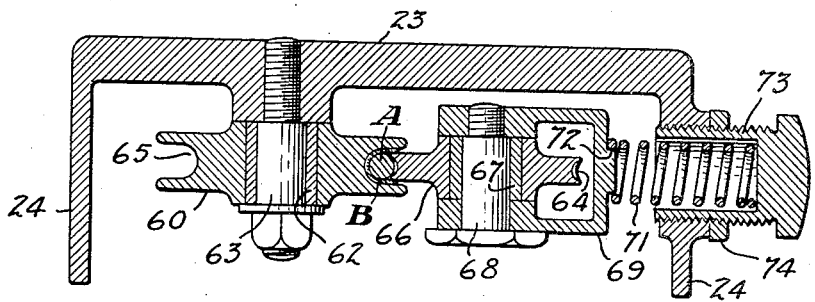
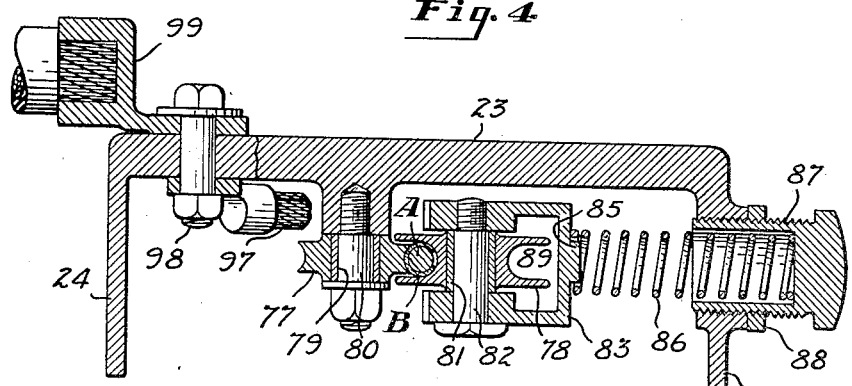
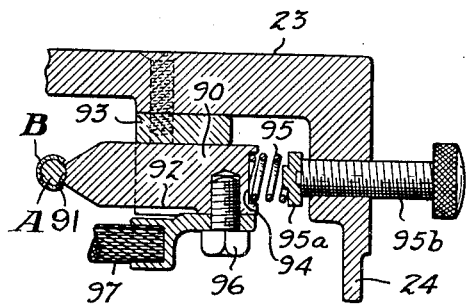
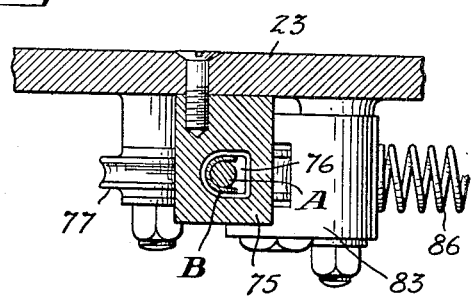
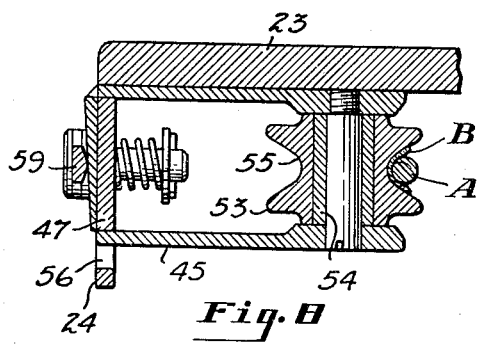

2,209,893

UNITED STATES PATENT OFFICE 2,209,893

WELDING APPARATUS

Karl W. Schreeck, East Cleveland, Ohio, assignor to Una Welding, Inc., East Cleveland, Ohio, a corporation of Delaware Application July 23, 1938, Serial No. 220,963

8 Claims. (Cl. 219—8)

This invention relates to automatic welding equipment and particularly to a welding head which includes means for automatically feeding welding wire to the work and for simultaneously feeding and forming a flux carrying tape about the welding wire.

One of the objects of the present invention is to provide a welding head with improved means for automatically feeding a tape of suitable character with the welding wire and for forming the tape about the wire.

Another object is to provide an automatic welding head with wire and tape feeding means in which the heating effect in the welding wire and the feeding unit is minimized.

Another object is to provide an automatic welding head in which the current carrying capacity of the unit is materially increased over welding units heretofore known.

Another object is to provide an automatic welding head with improved means for initially associating the tape with the welding wire.

Another object is to provide a tape folding or wrapping means that is actuated solely by the feeding movement of the welding wire.

With the above and other objects in view, the present invention consists in certain features of construction and combinations of parts to be hereinafter described with reference to the accompanying drawings and then claimed.

In the drawings which illustrate a suitable embodiment of the invention, Figure 1 is a perspective view of the welding head, showing the same associated with a wire feeding mechanism;

Figure 2 is an enlarged front plan view of the welding head showing the relationship of the various feeding and forming rollers and the current brushes;

Figure 3 is a fragmentary diagrammatic view showing the tape in the process of being shaped about the welding wire;

Figure 4 is a transverse section taken on line 4—4 of Figure 2;

Figure 5 is a transverse section taken on line 5—5 of Figure 2;

Figure 6 is a transverse section taken on line 6—6 of Figure 2;

Figure 7 is a transverse section taken on line 7—7 of Figure 2;

Figure 8 is a transverse section taken on line 8—8 of Figure 2;

Figure 9 is a transverse section taken on line 9—9 of Figure 2; and

Figure 10 is a transverse section taken on line 10—10 of Figure 2.

Briefly, the apparatus of the present invention has to do with the provision of an automatic welding head of advantageous construction in which the flow of current through the welding wire is confined to a relatively short distance whereby to eliminate or minimize the production of heat within the casing which contains the tape feeding and wrapping or folding mechanism and to insure for maximum current carrying capacity of the welding wire. The invention also has to do with the forming of the tape about the welding wire in progressive stages so as to provide for a well shaped tape in close fitting circumferential engagement with the welding wire, which is accomplished by the arranging of the forming or shaping elements in a particular manner whereby to obviate costly driving mechanism and to provide a welding head of simplified and extremely efficient construction.

Referring to the accompanying drawings in which like numerals refer to like parts throughout the several views, the casing 20 which houses the apparatus constituting the welding head of the present invention is attached to a suitable wire feeding mechanism 21. The wire feeding mechanism 21 shown is that illustrated in detail in United States Patent No. 2,079,956 of L. S. Burgett, dated May 11, 1937, and need not be further described, except to refer to the rollers 22 which positively feed the welding wire A in a downward direction to the welding head. It is to be understood, however, that other types of feeding mechanism may be employed.

The casing 20 is in the form of a rectangular box having a back wall 23, side walls 24, a top wall 25, a bottom wall 26 and an open front arranged to be closed by a door 27 hinged to one of the side walls 24. The top wall 25 is formed with an opening 28 which threadably receives a supporting member 29 hinged by means of a bolt 30 to a vertical plate 31 carried by the wire feeding mechanism 21. In order to adjust the welding head to an angle with respect to the vertical, the member 29 is formed with a bored projection 32 which extends upwardly beyond the bolt 30 and carries a rotatable cylinder 33. The plate 31 is provided with a lug 34 through which an adjusting screw 35 is threaded, the free end of the screw 35 extending through slots 36 in the projection 32 and being threaded through the cylinder 33. By rotating the screw 35 the welding head may be swung through an arc to adjust the head to a desired angle with respect to the work. Lock nuts 37 are provided to lock the screw against inadvertent rotation.

The plate 31 is provided with a vertical hole 38 in alignment with an axial opening 39 through the member 29 so that the welding wire A will feed therethrough from the feed rollers 22 into the interior of the casing 20.

The welding wire A is fed vertically downwardly through the casing 20 and leaves the same through a nozzle tip secured to the bottom wall 26 of the casing and having a portion 41 extending through an opening 42 into the casing 20. The nozzle tip 40 is preferably inclined slightly with respect to the vertical and is provided with a tapered opening 43 which guides the welding wire A, the opening at the bottom end of the tip being of smaller diameter than at the other end and being cylindrical whereby to firmly hold the wire A.

As the welding wire A is fed through the casing 20, a tap B is fed therewith and wrapped therearound. The tape B may be a material such as paper, fabric, asbestos or any other material capable of such use and may be coated with various chemicals, fluxing or slag producing materials etc., as may be desirable. The tape is led from a reel (not shown) on which it is rolled and as it passes through the casing 20 is wrapped about its vertical axis around the welding wire, as will now be described.

The tape B enters the casing 21 through a removable guide arrangement 44 comprising, as shown in Figures 2, 8 and 9, a pair of spaced side plates 45 having at its left end, as viewed in Figure 2, a connecting end piece 46 provided with a horizontal portion 47 extending inwardly between the plates 45. Secured by screws 48 to the portion 47 is an interchangeable guide element 49 having a horizontal slot 50, therethrough for guiding the tape B, preferably with a slight friction. The upper right corner, as viewed in Figure 2, is provided with a flat roller 51 mounted on a suitable bearing 52 and the lower right hand corner is provided with a roller 53 mounted on a suitable bearing 54. The roller 53 is formed with a wide semi-circular groove 55 for initially forming the tape.

The guide arrangement 44, is insertable into the casing 20 through an opening 56 in one of the casing sidewalls and is supported by the walls of the opening and a headed pin 57 projecting from the rear wall of the casing and extending into a slot 58 in the side plate 45. A spring mounted locking latch 59 is provided to engage the rear end of the guide arrangement 44 and lock the same within the casing. When the guide arrangement is in position the grooved roller 53 bears firmly against the welding wire A, thereby holding the tape in firm engagement throughout a narrow extent thereof with the welding wire.

In rethreading the apparatus with the tape, the latch 59 is released and the guide arrangement 44 is retracted to permit the free end of the tape to be inserted between the grooved roller 53 and the wire A.

The tape B next engages a forming roller 60 mounted on a bearing 62 carried by a pin 63 which is mounted on the back wall 23. The face of the roller 60 is, as shown in Figure 4, formed with a deep groove 65. A narrow pressure roller 66 having an arcuate groove 64 in its face is provided to force the wire A firmly against the bottom of the groove 65, causing the tape B to be further folded about the wire A, the walls of the groove 65 serving to smooth out the tape during this further folding operation.

The pressure roller 66, as shown in Figure 4, causes the welding wire B to lie entirely within the groove 65. The roller 66 is mounted on bearings 67 carried on a pin 68 extending through the legs of a bifurcated supporting arm 69, the arm 69 being pivoted on a pin 70 secured to the back wall 23. The pressure roller 66 is resiliently urged toward the forming roller 60 by means of a compression spring 71 which at one end engages with a projecting portion 72 of the arm 69, and which, at the opposite end, is received within a cup-shaped member 73 adjustably threaded through the side wall 24 and provided with a lock nut 74.

From the rollers 60 and 66 the tape and wire next pass through a die 75 having a tapered bore 76 wherein the sides of the tape B are formed circumferentially for the final forming operation which is accomplished by rollers 77 and 78, the roller 77 being a pressure roller.

The roller 77 is mounted on a bearing 79 carried by a pin 80 secured to the back wall 23 and has a narrow grooved face for engaging the central portion of the tape.

The roller 78 is mounted on a bearing 81 carried by a pin 82 extending through the legs of a bifurcated arm 83. The arm 83 is pivoted to a pin 84 secured to the back wall 23 and is provided with a projecting portion 85 which receives one end of a compression spring 86. The opposite end of the spring 86 is received within a cup-shaped member 87 adjustably threaded through the side wall 24 and provided with a lock nut 88.

The roller 78 has a deep peripheral groove 89 conforming substantially to the diameter of the tape-wrapped wire, the walls extending radially to overlap the roller 77 and thereby completely confine the tape and wire within the grooves formed by the two rollers whereby during passage therethrough the tape B is completely circumferentially shaped around the welding wire A, except for a narrow space between the edges thereof which is for a purpose to be presently described.

The bearings for the various rollers described are preferably of the oilless type. However, other types may be employed.

By referring to Figures 3, 5, 7, and 8, the steps in forming the tape B around the welding wire A may be clearly seen. As the tape passes through the guide element 49 it is smoothed or ironed out. It then passes over the guide roller 51 and is brought by the roller 53 into engagement with the wire A where it is caused by the grooved face of the roller 53 to assume a dished or trough shape, the wire being located at the bottom of the trough. As the tape and wire pass between the rollers 60 and 66, the sides of the tape projecting beyond the wire are brought into parallel relationship so that as they pass through the tapered die bore 76 they are caused to turn inwardly toward each other. The groove in the face of the roller 60 tends to stretch and smooth out the tape from its longitudinal axis so as to provide for firm wrapping or folding of the tape about the wire. These sides or edges as they next pass between the rollers 77 and 78 are brought farther toward each other and rolled firmly against the wire A.

It is to be noted that no mechanical mechanism is provided for feeding the tape or driving the forming rollers. In the arrangement shown and described no such mechanism is necessary.

The welding wire A, as previously described, is propelled by the friction rollers 22 of the wire feeding mechanism 21. A firm but yielding pressure is maintained by the springs 71 and 86 on the rollers 66 and 78, respectively, which rollers in conjunction with the rollers 60 and 77 exert a pressure on the tape and wire such that the tape is pulled along with the wire, and such that the rollers 53, 60, 66, 77 and 78 are rotated by the movement of the wire.

If desired, the face of the roller 66 may be knurled or transversely corrugated, as shown, so as to have intimate engagement with the wire.

In automatic welding apparatus, it is common practice to use the welding wire as one pole of the electrical connection and to ground the work C to provide the other connection. In cases where a tape is employed, it has been the practice to form the one electrical connection by a brush engaging the wire and at a point in advance of the contact of the tape therewith. One objection to this is that immense heat is created due to the great length of wire through which the current passes. Another objection is that the current carrying capacity of the welding wire is effected to a considerable extent by the great length of welding wire through which the current is forced to travel. These objections are overcome in the present invention, by arranging the brush at the point where the wire leaves the casing 20 so that the current flows through only a relatively short length of the wire.

In the construction of the present invention, a brush 90 is provided with a long and narrow face 91 for engagement with the welding wire at the narrow space left exposed by the parallel marginal edges of the tape B. This brush is located below the rollers 77 and 78 and adjacent the bottom wall 26 of the casing 20. It is to be noted that the brush 90 is composed of a large mass of conductive material, the width being reduced substantially, only at the face 91, whereby to obtain the maximum current carrying capacity.

The brush 90 is provided with a squared guide portion 92 which is slidably mounted within a lug 93 formed on or secured to the back wall 23, the lug 93 being shaped to guide the portion 92. The portion 92 is provided with a pocket 94 and interposed between this pocket and a cap portion 95a carried by an adjusting screw 95b threaded through the side wall 24 is a compression spring 95 which urges the brush into contact with the welding wire A. A screw 96 is provided to secure one end of a current conducting cable 97 to the brush 90. The opposite end of the cable 97 is secured to a terminal post 98 that extends through the casing 20 and to which a cable 99, extending to the current source, is secured.

In order to insure the flow of current in the event of failure of the brush 90 whereby a welding operation may be continued without interruption I provide a second brush 90a mounted in the same manner as the brush 90 to frictionally engage the welding wire A. This brush is mounted adjacent the top wall 25 and is provided with a current conducting cable 97a connected to a terminal post 100 secured to the casing 20.

The casing 20 is preferably made of aluminum or an alloy thereof, and during normal operation substantially all of the current will flow from the terminal post 98 through cable 97 to the brush 90. No appreciable amount of current will flow through the casing 20 to the brush 90a and no heat will be produced in the welding wire above the brush 90 due to current flow. However, should the brush 90 fail to function, substantially all of the current will flow immediately through the casing to the brush 90a with the result that a welding operation need not be interrupted to change or repair the brush 90.

It is evident from the foregoing disclosure that I have provided an improved welding apparatus for continuous arc welding in which improved yet simple means is provided for feeding and forming the tape with and about the welding wire, thereby insuring the proper supply of fluxing material or other ingredients, and in which excess heating within the casing and of the welding wire is minimized.

While the embodiment shown constitutes the preferred form, it is to be understood that various modifications may be made without departing from the scope of the appended claims.

I claim:

1. In an arc welding apparatus which utilizes as one electrode a metal in the form of a wire to be fed into the arc struck between the metal and the work to be welded, means for feeding the wire into the arc, opposed means for laterally deforming and folding a tape about the wire to enclose the wire except for a narrow space between the edges of the tape, and a current-carrying brush engaging the wire through said space.

2. In an arc welding apparatus which utilizes as one electrode a metal in the form of a wire to be fed into the arc struck between the metal and the work to be welded, means for feeding the wire into the arc, opposed means for laterally deforming and folding a tape about the wire to substantially circumferentially enclose the wire, guide means for the tape enclosed wire, said guide means being between said deforming means and the work to be welded, and current carrying means between said guide and said deforming means for engaging the wire between the marginal edges of the tape.

3. In an arc welding apparatus for simultaneously feeding a welding wire and a tape to the work to be welded, means for propelling the wire longitudinally, opposed means for forming the tape substantially completely circumferentially about the wire, guide means for directing the formed tape and wire toward the work, and current carrying means arranged between said tape forming means and guide means for supplying current to the wire.

4. In an arc welding apparatus in which the welding wire serves as one electrode and in which a tape is laterally deformed about the welding wire to substantially circumferentially enclose the same, means for feeding the wire and tape into the arc struck between the wire and the work to be welded, and current-carrying means for engaging the wire between the edges of the formed tape and at a region relatively close to the arcing end of the wire whereby to confine the flow of current through the wire to a relatively short length thereof.

5. In an arc welding apparatus in which the welding wire serves as one electrode and in which a tape is laterally deformed about the welding wire, means for feeding the wire into the arc struck between the wire and the work to be welded, a casing having a guide passage therein through which the wire is fed to the work, opposed means within the casing for laterally deforming the tape about the welding wire to substantially circumferentially enclose the same with the edges of the tape slightly spaced and substantially in parallelism, and a current carrying brush between said deforming means and said guide passage for engaging the wire adjacent the mouth of said passage and between the edges of said tape.

6. In an arc welding apparatus in which a welding wire and a tape are simultaneously fed to the work to be welded, means for longitudinally feeding the wire, a tape guide means including a roller for impinging the tape against the wire, a support for removably supporting said guide means, and means associated with said support for locking said guide means in fixed position with the tape gripped between said roller and the wire.

7. In an arc welding apparatus in which a welding wire and a tape are simultaneously fed to the work to be welded, means for longitudinally feeding the wire, a casing having openings therein for the passage of the wire therethrough and an opening in a wall thereof, a guide means removably positioned in said last mentioned opening, means on said casing for slidably supporting said guide means adjacent said wire, said guide means including a tape-engaging roller for firmly holding said tape against said wire, and means on said casing for locking said guide means in position whereby to prevent movement of said roller away from said wire.

8. In an arc welding apparatus in which the welding wire serves as one electrode, means for feeding the wire into the arc struck between the wire and the work to be welded, a current carrying brush in contact with said wire for conveying current thereto, and means for feeding and laterally deforming a tape about the wire including opposed cooperating rollers, one of said rollers impinging the tape against the wire and said rollers cooperating to substantially completely circumferentially enclose the wire within said tape, said rollers being driven solely by the movement of the welding wire and being located between said brush and said wire feeding means.

KARL W. SCHREECK.